S. J. JAMES.
STREET OR STATION INDICATOR.
APPLICATION FILED SEPT. 9, 1913.
1,101,444.
Patented June 23, 1914.
3 SHEETS—SHEET 1.
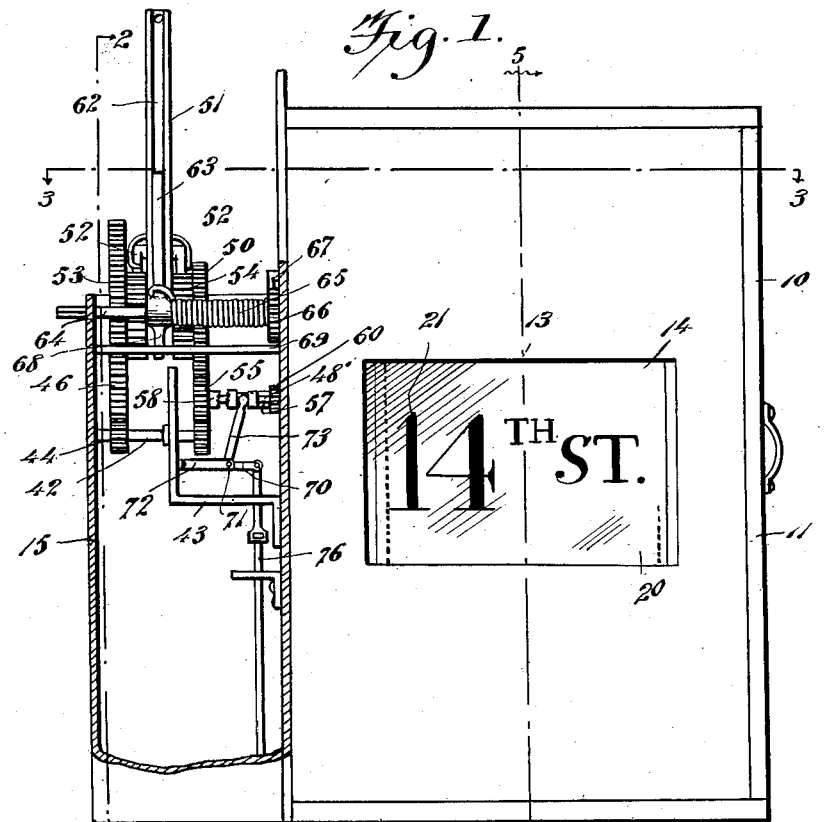
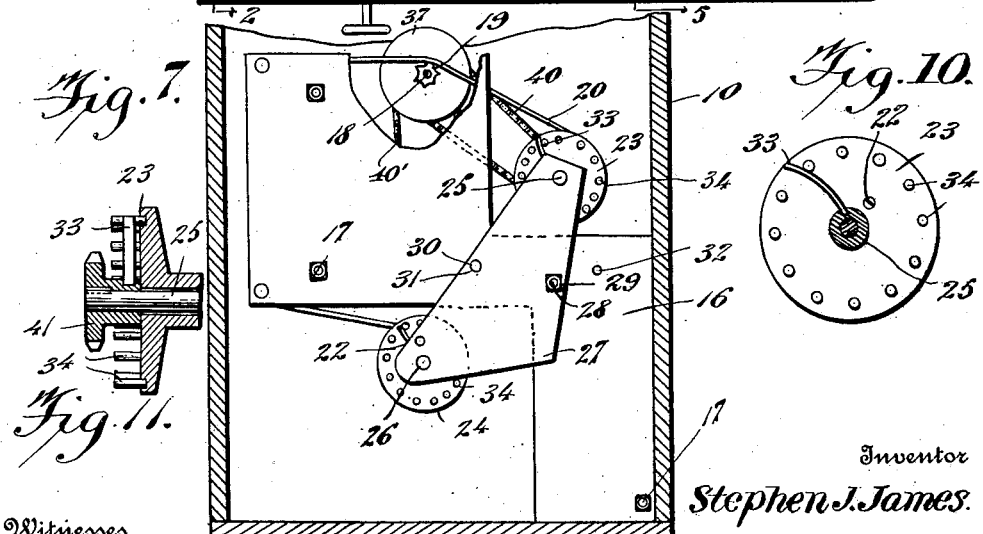
Inventor
Stephen J. James.
Witnesses
W. S. McDowell
F. O. Parker
By Victor J. Evans
Attorney S. J. JAMES.
STREET OR STATION INDICATOR.
APPLICATION FILED SEPT. 9, 1913.
1,101,444.
Patented June 23, 1914.
3 SHEETS—SHEET 2.
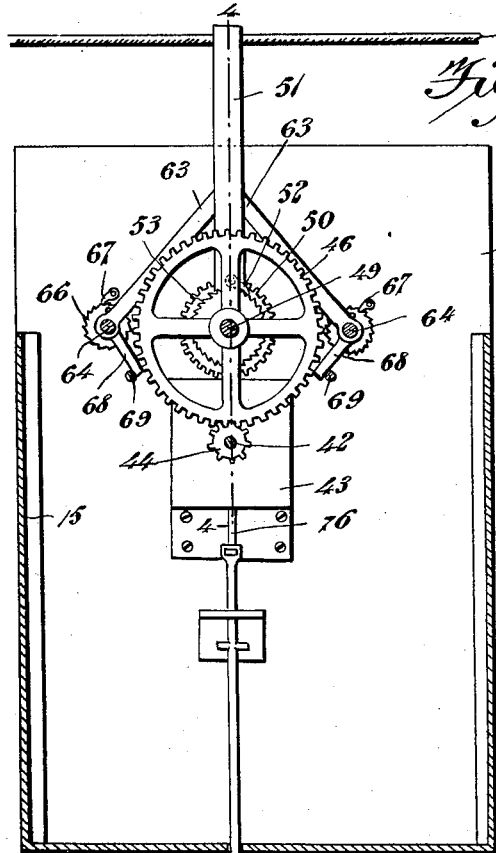
Fig. 2.
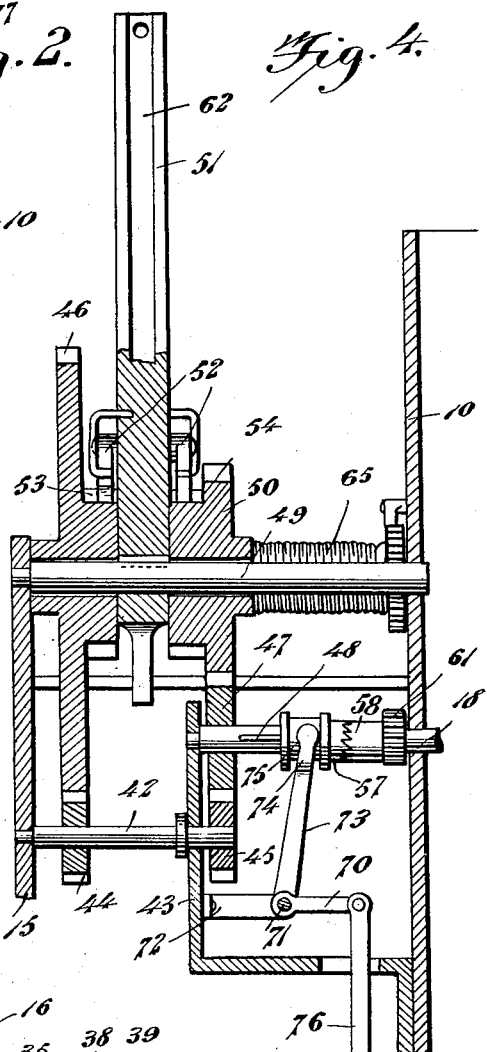
Fig. 4.
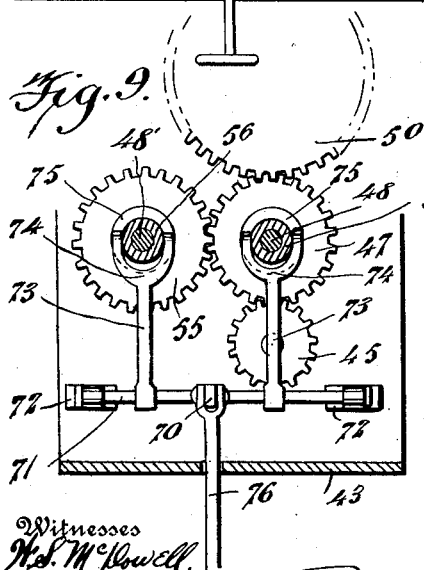
Fig. 9.
Fig. 8.
Witnesses
W. S. McDowell
F. O. Parker
Inventor
Stephen J. James
By Victor J. Evans
Attorney S. J. JAMES.
STREET OR STATION INDICATOR.
APPLICATION FILED SEPT. 9, 1913.
1,101,444.
Patented June 23, 1914.
3 SHEETS—SHEET 3.
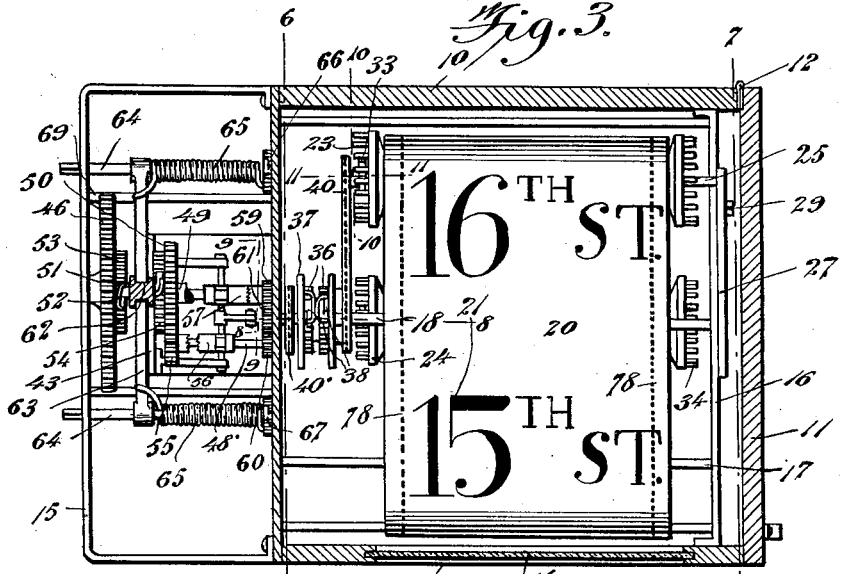
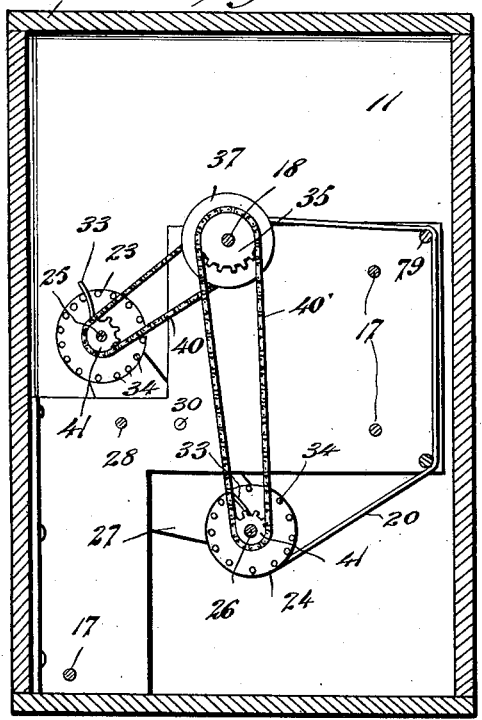
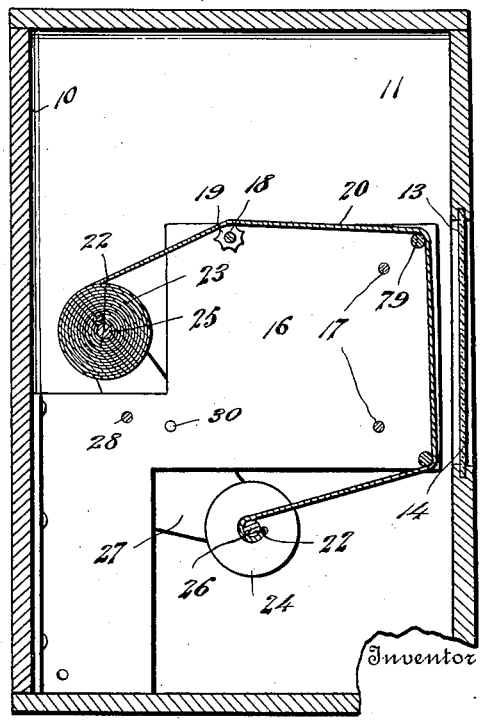
Witnesses
W. S. McDowell
F. O. Parker
Inventor
Stephen J. James
By Victor J. Evans
Attorney

UNITED STATES PATENT OFFICE.

STEPHEN J. JAMES, OF SEAFORD, DELAWARE.

STREET OR STATION INDICATOR.

1,101,444.  Specification of Letters Patent.  Patented June 23, 1914.

Application filed September 9, 1913. Serial No. 788,883.

*To all whom it may concern:*

Be it known that I, STEPHEN J. JAMES, a citizen of the United States, residing at Seaford, in the county of Sussex and State of Delaware, have invented new and useful Improvements in Street or Station Indicators, of which the following is a specification.

The invention relates to indicators, and more particularly to the class of street or station indicators.

The primary object of the invention is the provision of an indicator wherein the names of streets or stations can be successively shown so that each will be visible to the occupant, occupants or passengers of a vehicle, thereby giving notice of the location of the vehicle throughout its course of travel to enable persons to determine their point of destination while traveling in the vehicle.

Another object of the invention is the provision of an indicator of this character wherein a single lever can be operated by the swinging thereof in two directions so that the indicating mechanism will be automatically actuated thereby for the bringing to view successively names of streets intersecting the course of travel of the vehicle so that persons riding therein can conveniently determine their getting off points throughout the route of the vehicle, the lever being controlled from either end of the vehicle by means of pull connections manipulated by the operator of the vehicle.

A further object of the invention is the provision of an indicator of this character wherein the apron strip carrying the street names is movably supported and is adapted to be continuously wound upon a spool on the unwinding thereof from another spool, the spools being mounted in a novel manner so as to prevent the tearing or otherwise mutilation of the apron or strip and also to sustain the same taut.

A still further object of the invention is the provision of an indicator of this character in which the automatic winding of the strip carrying the indicia on and the unwinding thereof from the spool is effected in a novel manner, the said strip being intermittently shifted so that the names of streets will each be displayed or made visible in successive order for the reading thereof by the occupants of a moving vehicle to enable said occupants to determine the point of location of the car in its course of travel.

A still further object of the invention is the provision of an indicator of this character which is extremely simple in construction, thoroughly reliable and efficient in operation, readily and easily actuated, capable of being mounted in a vehicle at a convenient point for observation, and also one which may be manufactured at a minimum expense.

With these and other objects in view, the invention consists in the construction, combination and arrangement of parts as will be hereinafter fully described, illustrated in the accompanying drawing, and pointed out in the claims hereunto appended.

In the drawings:—Figure 1 is a front elevation of an indicator constructed in accordance with the invention, the same being partly in vertical section. Fig. 2 is a sectional view on the line 2—2 of Fig. 1, looking in the direction of the arrow. Fig. 3 is a sectional view on the line 3—3 of Fig. 1, looking in the direction of the arrow. Fig. 4 is a fragmentary enlarged sectional view on the line 4—4 of Fig. 2. Fig. 5 is a sectional view on the line 5—5 of Fig. 1. Fig. 6 is a sectional view on the line 6—6 of Fig. 3. Fig. 7 is a sectional view on the line 7—7 of Fig. 3, and is slightly enlarged. Fig. 8 is a sectional view on the line 8—8 of Fig. 3. Fig. 9 is a fragmentary sectional view on the line 9—9 of Fig. 3. Fig. 10 is a sectional view on the line 10—10 of Fig. 3. Fig. 11 is a sectional view on the line 11—11 of Fig. 3.

Referring to the drawings by numerals, the indicator comprises a substantially rectangular shaped box-like body 10 forming a casing preferably constructed from wood and metal, although it may be made from other material or materials if found expedient, the body or casing 10 being provided at one side with a door 11 hung with suitable hinges 12 which are secured to the body or casing and door respectively so that the latter when swung to open position permits access to be had to the interior of the said casing or body. Formed in the front wall of the casing or body 10 is a peep or sight opening 13 covered as usual with a transparent panel of glass 14, the latter being held therein in any suitable manner. Suitably fixed to the other side of the body or casing 10 is a housing 15 for accommodating the indicator operating mechanism, the indicator mechanism being confined within the body or casing 10 and is constructed in a manner hereinafter more fully described.

The indicator mechanism comprises a supporting frame which includes a side plate 16 which is suitably fastened to walls of the body or casing 10 and has engaged in or made fast thereto spacer bars 17 which are also engaged in or secured to one side wall of the body or casing 10 as shown. Journaled in this plate 16 and the wall of the body or casing 10 is a driven feed shaft 18 carrying spaced toothed or spur feed gears or wheels 19, and over this shaft 18 is trained a flexible apron or strip 20 having printed or otherwise impressed thereon street numbers as at 21, although in lieu of the numbers the names of streets may appear thereon so that each name of the street will in successive order appear at the opening 13 in the body or casing so as to be visible therethrough, the ends of the apron or strip 20 being formed with loops through each of which is passed a locking pin 22, the said pin 22 being removably held in winding and unwinding rollers 23 and 24 respectively, detachably mounted upon journals or shafts 25 and 26 respectively, which are journaled in one side of the body or casing 10 and in a rocking or swinging support 27, the support being formed with an aperture 30 in which is engaged a holding pin 31 permanently mounted and projected from the side plate 16 of the frame so that the nut 29 when worked inwardly on the stud 28 will protrude the pin 31 through the aperture 30 thereby holding the support 27 against turning movement. On loosening the nut 29 upon the threaded stud 28 the support 27 can be moved outwardly and disengaged from the retaining pin 31 to release the ends of the shafts 25 and 26 engaged therein so that the winding and unwinding spools 23 and 24 can be removed from the shafts for the changing of the flexible apron or strip 20 should it be desired, the support 27 being swung against a stop pin or lug 32 on removing the winding and unwinding spools 23 and 24 so as not to interfere with the removal of the same from the frame of the indicator mechanism.

The shafts 25 and 26 each has fixed thereto a leaf spring 33 which is adapted to project into the path of a series of spaced holding pins 34, the latter being mounted concentrically on opposite ends of the spools 23 and 24 so that when the same are reversed on the shafts the said pins 34 on the end adjacent to the leaf spring 33 will be engaged thereby for the locking of the spool to turn with the shaft under ordinary conditions, but should the apron or strip 20 become stretched or taut, or become entirely unwound from one of the spools the latter will remain stationary by reason of the springs 33 tripping over the pins 34, thereby avoiding the tearing or otherwise damaging of the apron 30 during the continued operation of the device.

Loosely journaled on the feed shaft 18 are sprocket wheels 35, while fixed to the said shaft 18 adjacent thereto are ratchet wheels 36, and formed on the said sprocket wheels are spiders 37 having pivotally connected thereto trip locking dogs 38 acted upon by means of tension springs 39 carried by the said spiders 37 so that the pawls or dogs 38 will engage the ratchet wheels 36, thereby locking the sprocket wheels 35 to the shaft 18 in their turn, the dogs 38 being reversely set and likewise are the ratchet wheels 36 so that when one of the sprocket wheels is locked to the shaft the other one will be free thereon. Trained over the sprocket wheels 35 are sprocket chains 40 and 40', the same being also trained over sprocket wheels 41 fixed to the shafts 25 and 26 respectively, the said sprocket wheels 41 being of less size than the wheels 35 so that on the driving of the shaft 18 motion therefrom will be imparted to the shafts 25 and 26 for rotating the same in their order, thus causing the apron or strip 20 to be wound upon one spool and unwound from the other spool, as will be clearly apparent, the shaft 18 being operated in a manner presently described.

Arranged in the housing 15 is the indicator operating mechanism comprising a counter shaft 42 which is journaled in the housing 15 and also in a bracket 43 which is fixed to the side wall of the body or casing 10, the said shaft 42 being provided with cog gears 44 and 45 respectively, meshing with a train of gearing including a large gear 46 and a small gear 47, the latter being fixed to one of a pair of stud shafts 48 and 48' journaled in the bracket 43 and the side wall adjacent thereto of the body or casing 10, while the larger gear 46 is loosely journaled upon a rocking shaft 49 journaled in the housing 15 and the said body or casing 10. On the rocking shaft 49 is also loosely journaled a gear 50 meshing with the gear 47, the gears 46 and 50 being spaced from each other on the said shaft 49 to accommodate therebetween an operating lever 51 which is fixed to the said rocking shaft 49 and carries at opposite sides spring held reversely acting locking pawls or dogs 52 engaging reversely rotatable ratchet wheels 53 and 54 respectively, the former ratchet wheel being integral with the gear 46 while the ratchet wheel 54 is integral with the gear 50 so that on the rocking of the lever forwardly and rearwardly the gears 46 and 50 will be rotated for driving the shaft 48 in one direction. The shaft 48' has fixed thereto a gear 55 meshing with the gear 47 and these shafts 48 and 48' have splined or keyed thereto reversely sliding clutches 57 and 56 which are adapted to be alternately thrown into and out of engagement with companion clutch sleeves 58 on the said shafts 48 and 48'. The clutch sleeve on the shaft 48 is loose thereon and is integral with a pinion 59, while the clutch sleeve 58 on the shaft 48' is integral with the gear 55 which is free on the said shaft 48'. The shaft 48' has fixed thereto a pinion 60 which meshes with a pinion 61 fixed to the feed shaft 18, while the pinion 59 on the shaft 48 is free therefrom and meshes with the said pinion 61 so that when the clutch 57 is thrown into engagement with the companion clutch sleeve 58 it will lock the pinion 59 on the said shaft 48 for the driving of the pinion 61 in one direction, while the shaft 48' will be turning idly. Now, on disengaging the clutch 57 from the companion clutch sleeve 58 and engaging the clutch 56 with the companion clutch sleeve 58 on the shaft 48' motion will be transferred from the gear 47 through gear 55 to the said shaft 48', thence to the pinion 60 which drives pinion 61 in the reverse direction. Thus it will be seen that the spools can be driven in reverse directions for directing the travel of the apron or strip 20 for the winding of the same on one spool and the unwinding thereof from the other spool or vice versa. In this manner the street numbers 21 will be successively positioned to be visible through the sight or peep opening 13 in the body or casing 10 of the device.

The operating lever 51 is formed in opposite sides with guide channels 62 in which engage the free ends of spring held props or arms 63 arranged at opposite sides of the said lever 51 and these arms 63 are loosely engaged on turning shafts 64 journaled in the housing 15 and the wall adjacent thereto of the body or casing. These props or arms 63 are designed to sustain the operating lever 51 in neutral or perpendicular position after pulling action exerted thereon is relieved therefrom, the arms being tensioned in a manner presently described.

Surrounding the turning shaft 64 are coiled springs 65 one end of each engaging the prop or arm 63 adjacent thereto, while its opposite end is fixed to a ratchet wheel 66 secured to the shaft 64, the ratchet wheel 66 on the said shaft 64 being engaged by means of pivoted ratchet dogs 67 which prevent the unwinding of the springs 65 and permit the same to be tensioned to the required degree on the turning of the shaft 64 with any suitable key when the same is engaged with the outer ends thereof. These springs 65 when tensioned will hold the arms or props 63 in convergent relation to each other and engaged in the channels 62 of the operating lever 51 to act upon the latter for sustaining it neutral or perpendicular when inactive.

The arms or props 63 have engaged therein stop pins 68 which are designed to normally rest against cross tie rods 69 stationarily mounted in the housing 15 so that the inward movement of the props or arms 63 will be limited and also in this manner the tension of the springs will be resisted to prevent the throwing of the props or arms inwardly thereby beyond a predetermined point which would result in offsetting the operating lever 51 from perpendicular position when inactive. It will be evident that the props or arms 63 under the action of the springs 65 serve to return the operating lever 51 to normal perpendicular position after the same has been pulled in either direction for actuating the indicator mechanism.

Pivotally connected to the bracket 42 in the housing 15 is a lever 70, which is connected with a rocking shaft 71 journaled in bearings 72 carried by the bracket 43, the shaft 71 being provided with forked levers 73, the forks 74 of which engage in grooves 75 formed in the clutches 56 and 57 respectively, while the said lever 70 is loosely connected to a pull rod 76 which projects exteriorly of the housing 15 to be manually operated for the throwing of the clutches 56 and 57 alternately into and out of engagement with the companion clutch sleeves 58 on the shafts 48 and 48' for the driving of either of the said shafts and connecting the indicator operating mechanism with the indicator mechanism.

Connected with the operating lever 51 is a pull cord 77 which has its ends extended in opposite directions to opposite ends of a vehicle, car or the like so that the said operating lever 51 can be manipulated by an operator at either end of the vehicle or car to effect the automatic actuation of the indicator mechanism so that the street numbers appearing on the apron or strip 20 will be brought successively in position to be visible through the body or casing 10 by the occupants or passengers in the vehicle, car or the like, so that such persons can determine the location of the vehicle during its course of travel.

As heretofore stated, the spools 23 and 24 can be reversed, that is to say, after the unwinding of the apron or strip 20 from the spool 24 on to the spool 23 the said spools can be reversed on the shaft supporting the same, so that the last street number appearing on the under face of the apron or strip 20 will be visible through the sight or peep opening and each succeeding street number will be successively brought into position for the reading thereof on the unwinding of the apron or strip from one spool to the other, thereby permitting the proper indication of streets along the course of travel of the vehicle, car or the like when making a new trip, the apron or strip 20 being provided with perforations 78 near opposite longitudinal edges thereof for the positive engagement of the toothed feed wheels therewith, and thereby assuring the positive shifting of the apron or strip 20 without slipping of the same over the feed wheels during the working of the indicator.

The apron or strip 20 is trained over guide rollers 79. These rollers 79 are designed to guide the strip or apron 20 when being shifted on the working of the indicator and thereby prevent the wrinkling or the binding of the same when the said indicator is operated.

From the foregoing it is thought that the construction and manner of operation of the device will be clearly understood, and therefore a more extended explanation has been omitted.

What is claimed is:—

1. An indicating apparatus comprising a casing having a sight opening, reels arranged in said casing, a strip having its ends detachably connected with the reels for the winding of the same thereon and the unwinding thereof therefrom, and also provided at intervals with indicating indicia visible through the sight opening, a feed roller journaled in the casing and acting upon the strip for moving the same, connections between the feed roller and reels, means for permitting the slipping of either of said reels when excessive tension is exerted upon the strip, mechanism for driving the feed roller alternately in reverse directions, means for controlling the said mechanism, an oscillating lever operating the said mechanism, means for bringing the said lever to normal neutral position after actuating the same, and means for regulating the action of the means acting upon the said lever for bringing it to neutral position.

2. An indicating apparatus comprising a casing having a sight opening, reels arranged in said casing, a strip having its ends detachably connected with the reels for the winding of the same thereon and the unwinding thereof therefrom, and also provided at intervals with indicating indicia visible through the sight opening, a feed roller journaled in the casing and acting upon the strip for moving the same, connections between the feed roller and the reels, means for permitting the slipping of either of said reels when excessive tension is exerted upon the strip, mechanism for driving the feed roller alternately in reverse directions, means for controlling the said mechanism, an oscillating lever operating the said mechanism, means for bringing the said lever to normal neutral position after actuating the same, means for regulating the action of the means acting upon the said lever for bringing it to neutral position, and means for permitting the travel of the driving connection between either of the said reels and the feed roller independently of the rotation of the latter.

3. An indicating apparatus comprising a casing having a sight opening, reels arranged in said casing, a strip having its ends detachably connected with the reels for the winding of the same thereon and the unwinding thereof therefrom, and also provided at intervals with indicating indicia visible through the sight opening, a feed roller journaled in the casing and acting upon the strip for moving the same, connections between the feed roller and the reels, means for permitting the slipping of either of said reels when excessive tension is exerted upon the strip, mechanism for driving the feed roller alternately in reverse directions, means for controlling the said mechanism, an oscillating lever operating the said mechanism, means for bringing the said lever to normal neutral position after actuating the same, means for regulating the action of the means acting upon the said lever for bringing it to neutral position, means for permitting the travel of the driving connection between either of the said reels and the feed roller independently of the rotation of the latter, and guide rollers mounted in the casing for supporting the strip in visible relation to the sight opening in the said casing.

In testimony whereof I affix my signature in presence of two witnesses.

STEPHEN J. JAMES.

Witnesses:
W. H. THORNE,
FRANK A. ROACH.